United States Patent
Beskrovny et al.

(10) Patent No.: US 9,560,013 B2
(45) Date of Patent: Jan. 31, 2017

(54) FIREWALL BASED PREVENTION OF THE MALICIOUS INFORMATION FLOWS IN SMART HOME

(71) Applicant: SAMSUNG ELECTRONICS CO., LTD., Gyeonggi-do (KR)

(72) Inventors: Evgeny Beskrovny, Ramat Gan (IL); Yaacov Hoch, Ramat Gan (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/532,335

(22) Filed: Nov. 4, 2014

(65) Prior Publication Data
US 2016/0127315 A1     May 5, 2016

(51) Int. Cl.
*H04L 29/00* (2006.01)
*H04L 29/06* (2006.01)
*H04L 12/28* (2006.01)

(52) U.S. Cl.
CPC ....... *H04L 63/0218* (2013.01); *H04L 63/0227* (2013.01); *H04L 63/0263* (2013.01); *H04L 63/101* (2013.01); *H04L 63/145* (2013.01); *H04L 63/1416* (2013.01); *H04L 12/2803* (2013.01)

(58) Field of Classification Search
CPC combination set(s) only.
See application file for complete search history.

(56) References Cited

U.S. PATENT DOCUMENTS

| | | | |
|---|---|---|---|
| 2007/0067780 A1 | 3/2007 | Kumar | |
| 2007/0177737 A1* | 8/2007 | Jung | H04L 63/06 380/270 |
| 2007/0214504 A1* | 9/2007 | Milani Comparetti | H04L 63/1408 726/23 |
| 2008/0168558 A1 | 7/2008 | Kratzer et al. | |
| 2013/0031037 A1 | 1/2013 | Brandt et al. | |
| 2013/0223279 A1* | 8/2013 | Tinnakornsrisuphap | H04L 41/0809 370/254 |
| 2014/0317735 A1* | 10/2014 | Kolbitsch | H04L 63/145 726/23 |

FOREIGN PATENT DOCUMENTS

| | | |
|---|---|---|
| CN | 101166163 B | 7/2010 |
| CN | 101958817 B | 9/2012 |
| EP | 1 615 386 A1 | 1/2006 |

OTHER PUBLICATIONS

Brush et al. "Home Automation in the Wild: Challenges and Opportunities"; CHI 2011, May 7-12, 2011.
Perumal et al., "Development of an Embedded Smart Home Management Scheme"; International Journal of Smart Home vol. 7, No. 2, Mar. 2013.

* cited by examiner

*Primary Examiner* — Ghazal Shehni
(74) *Attorney, Agent, or Firm* — Jefferson IP Law, LLP

(57) ABSTRACT

A system for preventing malicious attacks on a device in a Smart Home network comprises logical circuitry suitable to compare information flows in said network with legal information flows stored in memory means.

14 Claims, 2 Drawing Sheets

FIREWALL BASED PREVENTION OF THE MALICIOUS INFORMATION FLOWS IN SMART HOME

FIELD OF THE INVENTION

The present invention relates to the protection of smart appliances from malicious attacks.

BACKGROUND OF THE INVENTION

One of the biggest and prominent trends in consumer electronics nowadays is converting regular devices into "smart" devices. More and more devices are becoming "intelligent" including simple devices such as thermostats, doors, washing machines, light bulbs, etc. In practice, an intelligent device is a mini computer that also exposes an interface to the outside world through which it is operated.

While each device is implemented in a different way there are many characteristics that are common to smart devices. For example they are always online and are expected to accept different commands. In many cases the functionality exposed to the outside world is similar to web technologies and some of the devices use plain web servers. The decision to use known technologies for smart devices is mainly driven by the fact that the development of the functionality is easy, the infrastructure is available and there are many people capable to implement them. However the downside of this decision is that the devices are vulnerable to widespread web vulnerabilities that are well known to people skilled in the art, and the devices themselves lack a security infrastructure. For example there is no antivirus or other tool available on the market for washing machines, since as of today's date nobody up until now developed or defined a standard security infrastructure for such devices.

On top of the growing array of the smart devices there is a new trend named "Smart Home", which allows operating all smart devices from outside the house through a convenient interface. The functionality provided by a Smart Home may include:
- an ability to check whether the doors and windows are closed;
- receiving alarms from smart smoke detectors;
- being notified of malfunctioning of smart devices or of the need for maintenance thereto.

Smart Home systems usually see all the home devices and can operate all of them. While the functionality provided by this technology is very convenient for the consumer there are many risks associated with it. Since all the devices comprise mini computers without a security layer, it is possible to install malware on the smart device in order to inflict damage. The attacker may do, inter alfa, the following attacks:
- by sending turn on/off commands frequently it is possible to break a device;
- by turning on all the devices when they are not needed it is possible to inflate the energy bill of the customer;
- it is possible to unlock the door;
- it is possible to record all the activities at home by connecting to the home surveillance system or even by issuing a command to the camera found on the Smart TV or on the cleaning robot.

Some attention has been given to the problems involved in operating Smart Home systems, but no suitable solution of the abovementioned problem has been provided in the art. For instance, CN 101166163B describes a system for providing access control and authentication for the Smart Home user using variety of methods. US 20070067780 A1 relates to the communication of Smart Devices that include implementation of the publish/subscribe mechanism over the protocol such as UPnP and to the security aspects of such a communication.

The article http://colindixon.com/wp-content/uploads/2012/04/homeos-chi2011.pdf describes problems that hamper the adoptability of smart systems. One of the problems mentioned is the security, but does not propose solutions to the problem. The paper http://www.sersc.org/journals/IJSH/vol7_no2_2013/2.pdf proposes an architecture of a Smart Home environment that is built around a Service Oriented Architecture (SOA) for Smart Home management system. The architecture proposed includes a gateway through which smart appliances are operated. The paper also specifies that this gateway may perform various tasks related to security such as authorization and firewalling, but no specific security solutions are provided.

To date the art has failed to provide specialized IPS/IDS systems for the Smart Home environment. The cyber intruder has a large attack surface given the wide range of various devices, each of which provides him with various attack opportunities. Currently, Smart Home systems are not equipped with means for stopping malicious attacks (also known as "exploitation") or even to detect them. It is therefore clear that there is a need to provide means and methods for blocking such exploitations and any other kind of malicious attack before they occur.

It is an object of the present invention to provide a method for blocking malicious software attacks against smart devices.

It is another object of the invention to provide means to operate firewall-like systems for protecting Smart Home systems.

Other objects and advantages of the invention will become apparent as the description proceeds.

SUMMARY OF THE INVENTION

In one aspect the invention relates to a system for preventing malicious attacks on a device in a Smart Home network, comprising logical circuitry suitable to compare information flows in said network with legal information flows stored in memory means. In one embodiment of the invention the legal information flows are determined during the system install. The system comprises logical circuitry adapted to block information flows that are not in the list of the legal information flows during normal use. According to one embodiment of the invention the IPS/IDS agent is located at the gateway.

In another aspect the invention is directed to a method for preventing malicious attacks on a device in a Smart Home network, comprising providing logical circuitry suitable to compare information flows in said network with legal information flows stored in memory means.

According to one embodiment of the invention the method comprises implementing a learning phase and then performing exploit prevention at runtime. In one embodiment of the invention the learning phase is done dynamically, while in another embodiment of the invention the method uses a network sniffer running in a promiscuous mode. The learning phase can also be done statically, according to a further embodiment of the invention, for instance by performing the static analysis using known algorithms which look for a specific networking APIs within a handler of the specific API. In yet another embodiment of the invention the learning phase is done by providing a predefined list of legal information flows. The method of the invention may further comprise including in the said predefined list also negative rules which explicitly prohibit message exchanges between specific devices.

In one embodiment of the invention the run time communication stack is modified such that instead of sending the message to the peer device the stack sends the message to the gateway, which analyzes the message with its context and either relays it to the intended peer device, if the message is legitimate (according to the learned behavior) or blocks it if the message is not legitimate.

According to one embodiment, a device in the network is configured so it receives the messages only from the gateway and not from other devices in the network. In another embodiment of the invention a message copy is sent to the gateway for authorization.

DETAILED DESCRIPTION OF THE INVENTION

According to the invention there is provided a two-phase solution according to which the information flows in the Smart Home is first learned, and then abnormal information flows are detected at runtime.

Typically Smart Home architecture consists of two kinds of entities:

Home API, which aggregates a Smart Home functionality.
Smart Devices API, which are the interfaces exposed by the devices through which they are operated.

The communication between the devices constitutes a mesh. The communication may be of different kinds:

Gateway to device—for example the gateway sends a message to a Smart TV (as an exemplary device), to find out which channel is currently being watched.

Device to gateway—for example a refrigerator sends the event to the gateway saying that the lamp inside the fridge is broken and needs to be replaced.

Device to device—for example a Smart watch may send a command to the thermostat to heat the water 15 minutes before the wake-up call.

The message exchanges that happen at home during day and night are called information flows. It is assumed that during normal activities these information flows are constant, as they are mapped to the particular messages the gateway or devices need to send. The entire interface exposed by the Smart Home API is not that large and the number of events that can be sent by the devices is also not that large and, therefore, the patterns of all the legal potential communication can be built during the system installation and device registration. When the device is hacked, however, it starts to behave differently. For example the device can be turned into a botnet and may start sending multiple messages to cause a denial of service, or the device that previously didn't communicate with some other device suddenly starts communicating with it. For example, the washing machine suddenly starts sending commands to the Smart TV to turn on its camera and start recording.

According to the invention the legal information flows are determined during the system install, and then all the information flows that are not in the list of the legal information flows are blocked during normal use. The invention therefore uses two phases: 1) learning and, 2) exploit prevention at runtime. According to one embodiment of the invention the Intrusion Prevention and Intrusion Detection Systems (IPS/IDS) agent is placed at the gateway, which is the entity that is normally assigned with different security tasks in Smart Homes. This functionality can be combined with the firewall and can be made a natural extension of the firewall functionality.

Learning Phase

Figure 1:
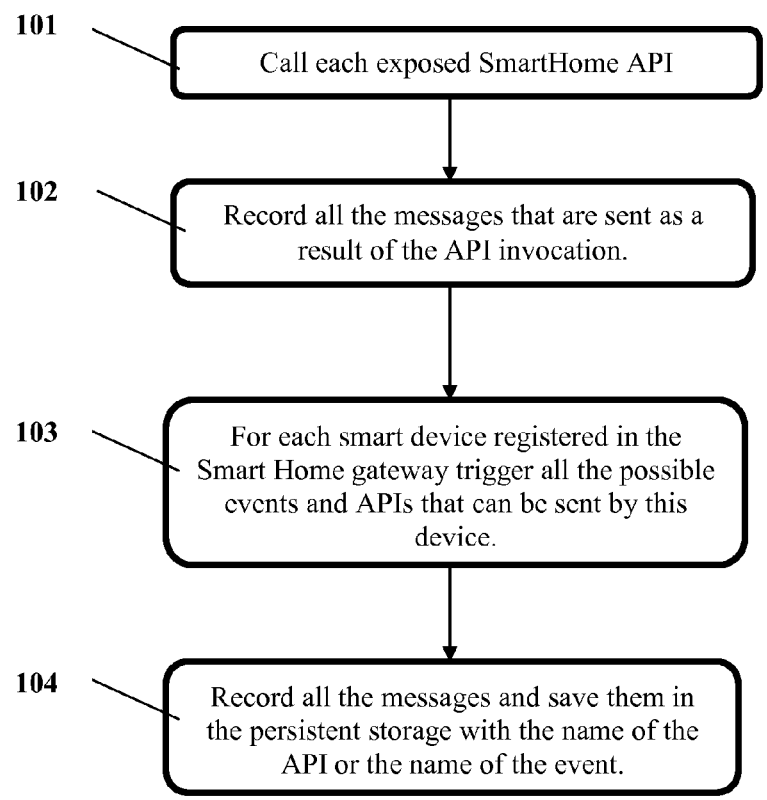
FIG. 1 schematically illustrates the steps in the Dynamic Learning phase.

The goal of the learning phase is to build a list of the legitimate information flows. This can be done by, according to specific embodiments of the invention, in different ways:

1) Dynamic Learning:

It is possible to equip the gateway functionality with network sniffer capabilities, which when is running in a promiscuous mode is capable to see all the messages that are sent in the network. This capability can rely, e.g., on the existing functionality in tools such as Wireshark (https://www.wireshark.org/download.html). Now during the system installation the technician may invoke all the exposed interfaces from the Smart Home API and it may trigger all the events that can be sent by the devices in order to trigger message sending. During the procedure all the messages exchanges are recorded by the gateway along with the context (the name of the API or the event) and these messages are saved in the list of the legitimate messages. This process is schematically shown in FIG. 1, in which the following steps are detailed:

at 101, call each exposed SmartHome API;
at 102, record all the messages that are sent as a result of the API invocation;
at 103, for each smart device registered in the Smart Home gateway trigger all the possible events and APIs that can be sent by this device; and
at 104, record all the messages and save them in the persistent storage with the name of the API or the name of the event.

2) Static Learning:

It is possible to perform a static analysis of the gateway code and of the code of the Smart devices in order to find the peers associated with the particular API or event and to build a data structure of the sent message. The static analysis uses known algorithms which look for a specific networking APIs within a handler of the specific API.

For example the static analysis may look for the keyword "send" which signifies a predefined networking API that is responsible for sending messages and is expected to be in the call graph in the branch that emanates from the API handler that handles invocation of some API. For example if a SmartHome exposes a functionality that allows to get a list of all the devices in home which are currently turned on via function GetListOfTurnedOnDevices, then this function will have an implementation that contains sending messages to devices in order to find out their status.

Figure 2:
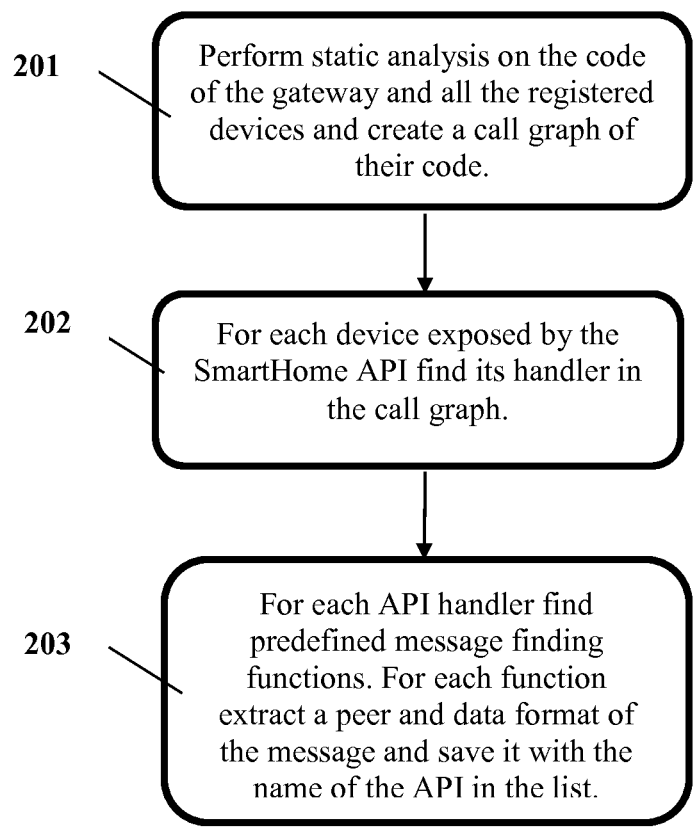
FIG. 2 schematically illustrates the steps in the Static Learning phase.

It is possible to extract the receiver peer from the send function and to associate a peer with this function. It also possible to see the data structure of the message sent or its size and to associate this data with this function. The steps involved in this procedure are schematically shown in FIG. 2, in which the following steps are detailed:

at 201, perform static analysis on the code of the gateway and all the registered devices and create a call graph of their code;
at 202, for each exposed by the SmartHome API find its handler in the call graph; and at 203, for each API handler find predefined message finding functions. For each function extract a peer and data format of the message and save it with the name of the API in the list.

3) Predefined List:

It is possible to have a predefined list that is created automatically for each network configuration based on the typical message exchange. The predefined rules may also include negative rules which explicitly prohibit message exchanges between specific devices.

Runtime

According to an embodiment of the invention the run time communication stack (for example of UPnP) is modified such that instead of sending the message to the peer device the stack sends the message to the gateway. The gateway analyzes the message with its context and either relays it to the intended peer device, if the message is legitimate (according to the learned behavior) or blocks it if the message is not legitimate. According to this embodiment of the invention the gateway receives all the messages in the Smart Home network thus obtaining complete visibility of all the message flows in the network and allowing it to correctly verify whether the information flow is legitimate or not. Moreover, according to this particular embodiment it is possible to configure the device so it receives the messages only from the gateway and not from other devices, which by itself reduces the potential attack surface of the Smart Home solution.

According to another embodiment of the invention a similar functionality is achieved by sending a message copy to the gateway and asking it to authorize it instead of having it relay the message to the device peer.

As will be appreciated by the skilled person, the invention permits significantly to reduce the impact of the penetration into a smart device as the damage it may inflict is limited to that device and does not compromise the full network as may happen in current systems.

All the above description of preferred embodiments has been provided for the purpose of illustration and is not intended to limit the invention in any way. Many modifications can be provided by the skilled person to the hardware and processes described above, without exceeding the scope of the invention.

The invention claimed is:

1. A gateway in a home network comprising a plurality of devices which are communicatively coupled to each other and to the gateway, comprising:
   a controller; and
   a storage,
   wherein the controller is configured to:
      compare information flows which comprise a message transferred between the plurality of devices with a list of legitimate information flows stored in the storage,
      block at least one information flow that is not in the list of the legitimate information flows from among the information flows, based on the comparison, and
      perform a learning phase for building the list of the legitimate information flows,
   wherein performing the learning phase comprises creating a predetermined list of legitimate information flows based on a typical message exchange for the home network.

2. The gateway according to claim 1, wherein performing the learning phase comprises using network sniffer capability which is capable to see messages which are sent in the home network.

3. The gateway according to claim 1, wherein performing the learning phase comprises:
   calling each of the plurality of devices;
   recording all messages which are sent as a result of the calling;
   triggering all possible events for each the plurality of devices; and
   storing all messages as a result of the triggering in the storage.

4. The gateway according to claim 1, wherein performing the learning phase comprises analyzing codes of the gateway and codes of the plurality of devices to find out peers associated with each of the plurality of devices.

5. The gateway according to claim 1, wherein the predetermined list of legitimate information flows includes negative rules which explicitly prohibit message exchange between specific devices.

6. The gateway according to claim 1, wherein the controller is further configured to relay the message to an intended device if the message is legitimate.

7. The gateway according to claim 1, wherein all messages between the plurality of the devices are sent through the gateway and not sent to another device directly.

8. A method for preventing malicious attack in a home network comprising a gateway and a plurality of devices which are communicatively coupled to each other and to the gateway, wherein the gateway comprises a controller and a storage, the method comprising:
   comparing, by the controller, information flows which comprise a message transferred between the plurality of devices with a list of legitimate information flows stored in the storage;
   blocking, by the controller, at least one information flow that is not in the list of the legitimate information flows from among the information flows, based on the comparison; and
   performing, by the controller, a learning phase for building the list of the legitimate information flows,
   wherein performing the learning phase comprises creating a predetermined list of legitimate information flows based on a typical message exchange for the home network.

9. The method according to claim 8, wherein performing the learning phase comprises using network sniffer capability which is capable to see messages which are sent in the home network.

10. The method according to claim 8, wherein performing the learning phase comprises:
    calling each of the plurality of devices;
    recording all messages which are sent as a result of the calling;
    triggering all possible events for each the plurality of devices; and
    storing all messages as a result of the triggering in the storage.

11. The method according to claim 8, wherein performing the learning phase comprises analyzing codes of the gateway and codes of the plurality of devices to find out peers associated with each of the plurality of devices.

12. The method according to claim 8, wherein the predetermined list of legitimate information flows includes negative rules which explicitly prohibit message exchange between specific devices.

13. The method according to claim 8, further comprising relaying, by the controller, the message to an intended device if the message is legitimate.

14. The method according to claim 8, wherein all messages between the plurality of the devices are sent through the gateway and not sent to another device directly.

* * * * *